United States Patent [19]

Milberg et al.

[11] 4,071,371

[45] Jan. 31, 1978

[54] HIGH TEMPERATURE CERAMIC MATERIAL SUITABLE FOR GAS TURBINE APPLICATIONS AND A PROCESS FOR PRODUCING SAME

[75] Inventors: Morton E. Milberg, Southfield; Wayne M. Miller, Belleville, both of Mich.

[73] Assignee: Ford Motor Company, Dearborn, Mich.

[21] Appl. No.: 556,030

[22] Filed: Mar. 6, 1975

[51] Int. Cl.² ............................................... C04B 35/58
[52] U.S. Cl. .................................. 106/65; 106/73.2; 106/73.4; 106/73.5
[58] Field of Search ...................... 106/65, 73.2, 73.4, 106/73.5

[56] References Cited

U.S. PATENT DOCUMENTS

| 3,830,652 | 8/1974 | Gazza | 106/73.5 |
| 3,837,871 | 9/1974 | Weaver | 106/65 |
| 3,969,125 | 7/1976 | Komeya et al. | 106/73.5 |

*Primary Examiner*—J. Poer
*Attorney, Agent, or Firm*—Joseph W. Malleck; Olin B. Johnson

[57] ABSTRACT

A method of making improved SIALON ceramics without the need for hot pressing, is disclosed. A homogeneous slip is prepared from $Si_3N_4$, $Al_2O_3$ and $Y_2O_3$ in the presence of a suspension agent; $Y_2O_3$ being present in at least 1% by weight (preferably between 1–25%) and $Al_2O_3$ being present in the range 16–40% by weight (preferably 16–18%). The slip is cast and dehydrated. The cast shape is reaction sintered at about 1550°–1700° C (preferably 1600° C) for no less than 3 hours (preferably between 3–12 hours).

2 Claims, No Drawings

HIGH TEMPERATURE CERAMIC MATERIAL SUITABLE FOR GAS TURBINE APPLICATIONS AND A PROCESS FOR PRODUCING SAME

BACKGROUND OF THE INVENTION

In recent years, silicon nitride, $Si_3N_4$, has been investigated extensively as a high strength ceramic material. Hot pressing has allowed $Si_3N_4$ to be prepared in forms which are very strong at room temperature (as exhibited by a transverse rupture strength, greater than 100,000 psi) provided suitable additives are incorporated into the material before hot pressing as hot pressing aids. Unfortunately, the hot pressing technique is unsuitable for making items of complex shape. Silicon nitride articles of complex shape may, however, be made by the process of reaction sintering, in which the desired shape is prepared (by cold pressing, slip casting, etc.) from silicon powder and then nitrided and sintered by heating in a nitrogen atmosphere. Articles prepared in this manner are, however, not very strong (10,000 to 40,000 psi in transverse bending).

Silicon nitride is believed to occur in two forms, $\alpha$ and $\beta$, both having structures based on the $Si_3N_4$ tetrahedra sharing corners. It is not certain, however, that either one is not stabilized by impurities, oxygen in the case of the $\alpha$ form or cations in the case of the $\beta$ form. It has now become possible, as known to the art, to react alumina with silicon nitride at high temperature to form a material with the same structure as $\beta$ - $Si_3N_4$, but an apparently somewhat larger unit cell. Ceramic materials prepared from a combination of silicon nitride and alumina are generally referred to by the name SIALON, an acronym for Si, Al, O and N. It is presumed that aluminum atoms replace some of the silicon atoms and oxygen atoms replace some of the nitrogen atoms in $\beta$ - $Si_3N_4$. It is not clear just how much $Al_2O_3$ can be accomodated in the $\beta$ - $Si_3N_4$ structure, since at least one additional phase, of uncertain composition and structure, is often formed as a result of the reaction. But it is now known how an intimate mixture of silicon nitride and alumina can be sintered to form a high strength ceramic in the absence of applied pressure, as well as by hot pressing. In most work currently being reported on the SIALON system, high strengths are not often achieved and, when they are, it is only by hot pressing.

SUMMARY OF THE INVENTION

A primary object of this invention is to provide a method of making high strength SIALON ceramics by a pressureless sintering technique which is more economical and permits the fabrication of complex shapes by a relatively simple sequence.

Another object is to provide a SIALON ceramic having an average modulus of rupture in 4-point bending at room temperature of at least 35,000 psi and which strength is achieved without pressure.

Particular features pursuant to the above objects comprise (a) the use of a sintering additive in the form of yttria ($Y_2O_3$) which is controlled in a heretofore unknown quantity relationship with alumina and silicon nitride to form a SIALON system; (b) regulating the pressureless sintering step to utilize considerably lower temperatures and considerably longer sintering periods compared to the state of the art.

DESCRIPTION OF THE TABLES

Table I shows properties of SIALON materials prepared without $Y_2O_3$. Letters P and H in $Si_3N_4$ column indicate Plessey and high purity AME materials, respectively; all others are standard AME material. Numbers in the $Si_3N_4$ and $Al_2O_3$ columns are weight % in the base mixture, while those in the other column give grams of additive per 100 grams of base mixture. $\sigma F$ is average MOR (modulus of rupture) in 4-point bending test at room temperature given in p.s.i., $n$ is the number of specimens in the MOR sample, $\rho$ is density in g/cc. Symbols in "composition" column mean: S=SIALON, X=extraneous phase, A=alumina, Si=silicon, $\alpha = \alpha$ - $Si_3N_4$, Sl=slight, Tr=trace. Compositions given are as determined from x-ray diffraction pattern. Specimens were cold pressed before sintering unless "slip cast" is specified in comments column.

Table II shows properties of SIALON materials prepared with $Y_2O_3$. Heading and symbols have same meanings as those in Table I. Numbers in $Y_2O_3$ column indicate grams of $Y_2O_3$ per 100g. base mixture. All specimens were sintered in argon and slip cast unless "pressed bars" is specified.

DETAILED DESCRIPTION

We have found that we can produce SIALON ceramics of high strength by pressureless sintering according to the following procedure:

Before sintering, a small amount of powdered $Y_2O_3$ is combined and thoroughly mixed with a mixture of powdered $Al_2O_3$ and powdered $Si_3N_4$, the combined mixture containing 16% to 40% or $Al_2O_3$ by weight, the amount of $Y_2O_3$ making up from 1% to 25% by weight of the combined mixture. The mixture of $Al_2O_3$, $Si_3N_4$ and $Y_2O_3$ powders is compacted into the desired shape by any appropriate technique; we generally used slip casting because of its suitability for forming complex shapes but cold pressing, for example, would also work in certain instances. Slip casting herein comprised adding a suspension agent, such as an alginate to the mixture, putting the slip into a plaster mold, and after solidification, stripping the molded shape from the mold to dry for about 12 hours. During the last hour of the drying time, the shape is dried at about 400° F.

The desired shape is then subjected to sintering by being heated in an inert atmosphere, such as argon, to a temperature between 1550° and 1700° C for a time period of between 3 and 12 hours.

The experimental procedure used to generate the data of Tables I and II employed starting materials selected from the group including (a) standard AME $Si_3N_4$ powder which was ball milled in benzene to a 2-3 $\mu$m particle size, (b) high purity AME $Si_3N_4$ powder, (c) Plessey high purity $Si_3N_4$ powder, (d) GTE Sylvania amorphous $Si_3N_4$ powder, (e) $Si_3N_4$ powder prepared in house by nitriding high purity silicon metal and then ball milling in benzene for 4 days, (f) Linde A$\alpha$ - $Al_2O_3$, [this is a metallurgical grade of 0.3 $\mu$m but some particles may agglomerate] (g) Baker reagent grade MgO powder, (h) Orion Chemical Co. 99.9% pure, 325 mesh AlN and (i) Research Chemicals 99.99% pure $Y_2O_3$ powder. Herein, reference to silicon nitride will mean standard AME $Si_3N_4$ unless one of the other materials is specified. As indicated earlier, specimens were prepared by both cold pressing and slip casting. For cold pressing, starting materials were weighed, ball milled in benzene for mixing, dried and pressed into bars at 20,000 p.s.i. No binders were used. When high purity AME Si$_3$N$_4$ was used, the ball milling was continued for 7 days. For slip casting, the starting materials were weighed and then ball milled with an alginate suspension. The slip was de-aired and cast into plaster molds. When using the GTE Sylvania and in-house prepared silicon nitrides, all steps were carried out in a glove box under a nitrogen atmosphere and pellets were hand pressed. All desired shapes or specimens were dried at 400° F in a forced air dryer.

Additive content is always quoted as percent by weight of the base mixture of silicon nitride and alumina. Thus, a mixture of 60% Si$_3$N$_4$, 40% Al$_2$O$_3$ and 3% Y$_2$O$_3$ refers to one containing 60g. Si$_3$N$_4$, 40g. Al$_2$O$_3$ plus 3g. Y$_2$O$_3$, and one of 84% Si$_3$N$_4$, 16% Al$_2$O$_3$ and 6% Y$_2$O$_3$ refers to a mixture containing 84g. Si$_3$N$_4$, 16g. Al$_2$O$_3$ plus 6g. Y$_2$O$_3$.

Sintering was done in a Tocco induction furnace. Desired shapes or specimens were placed in a BN crucible within a molybdenum susceptor contained in an alumina crucible. The space between the susceptor and the alumina crucible was packed with BN powder insulation. The entire assembly was dried at 400° F before sintering. After the assembly was placed in the induction furnace, the furnace was evacuated and then back filled with argon or nitrogen to 1 atmosphere. A flow of 1 cubic foot per hour was maintained throughout the sintering run. The gas passed through a purification chain before entering the furnace. In general, the desired sintering temperature (1550° to 1750° C) was attained in 1 to 1 ½ hours and maintained automatically. The furnace was allowed to cool naturally after shutdown. Temperature was measured with a thermocouple inside the BN crucible.

The room temperature MOR was measured using a 4-point bend test. Specimens were ¼ × ⅛ × 1.0 inch long with a surface ground to a 45 μm finish. Density was measured using standard ceramic immersion techniques.

The effect of Y$_2$O$_3$ additions and the sintering conditions can be seen by comparing Tables I and II. Note that all strengths are measured as modulus of rupture in 4-point bending at room temperature.

A glance at Table II shows that, in general, with relatively low sintering temperatures (1550°–1700° C) and long sintering times (3–12 hr.), the addition of Y$_2$O$_3$ produced very promising room temperature strengths. The highest strengths were obtained with Plessey high purity silicon nitride; indeed, with a mixture containing 84% of the silicon nitride and 16% alumina with 3% Y$_2$O$_3$ additive, a strength of 82,000 p.s.i. was obtained combined with a narrow spread in the measured MOR (example 22). The SIALON materials prepared from the Plessey Si$_3$N$_4$ were white to light gray rather than the dark gray to black obtained with AME Si$_3$N$_4$. In general, materials of very low and very high yttria contents were not as strong as those of intermediate yttria content; nonetheless yttria contents at the extreme end of the operative range permitted strengths in excess of 35,000 p.s.i. for certain mixtures and sintering conditions. Materials prepared with only 1% Y$_2$O$_3$ and 16% Al$_2$O$_3$ sintered for 12 hours at 1600° C (example 6) and for 4 hours at 1700° C (example 10) had average strengths of 46,000 p.s.i. and 50,000 p.s.i., respectively, while a material prepared with 25% Y$_2$O$_3$ and 33.3% Al$_2$O$_3$ sintered at 1600° C for 3 hours (example 36) had an average strength of 46,000 p.s.i.

It was found that, with 3% Y$_2$O$_3$, the standard mixture of 40% Al$_2$O$_3$ and 60% Si$_3$N$_4$ led to a SIALON containing an extraneous phase, alumina, or a combination of alumina and alpha silicon nitride, depending on the sintering temperature. It was further found, however, that when the alumina content was reduced to 16% by weight in the original mixture, and sintering was carried out for 8 hours at 1600° C, neither an extraneous crystalline phase nor an unreacted starting material was present in the SIALON (example 20). The strength of this material was reasonably high, but not among the highest produced. Products similary free of extraneous crystalline phases and reactants were produced (a) from the same mixture of Si$_3$N$_4$ and Al$_2$O$_3$ with 6% Y$_2$O$_3$ under the same sintering conditions as in example 20, (b) from an identical preparation sintered for 4 hours at 1600° C (example 16), (c) from one containing 64.4% Si$_3$N$_4$ and 35.6% Al$_2$O$_3$ with 16.1% Y$_2$O$_3$ additive sintered for 4 hours at 1600° C (example 35), and (d) from one containing 66.7% Si$_3$N$_4$, 33.3% Al$_2$O$_3$ and 25% Y$_2$O$_3$ sintered at 1600° C for 12 hours (example 38). A preparation of 84% Plessey Si$_3$N$_4$, 16% Al$_2$O$_3$ and 6% Y$_2$O$_3$ additive sintered at 1600° C for 8 hours (example 32) was not only free of extraneous phases and reactants, but had an average strength of 70,000 p.s.i. A systematic study of materials prepared with 3% Y$_2$O$_3$ and sintered at 1600° C for 8 hours showed that the final product contained alumina when the initial alumina content of the starting mixture was greater than 16% (Table II, examples 17 through 20). Since no unreacted silicon nitride was detected in these materials, it appears that 16% is the solubility limit of alumina under these conditions. Products prepared from a base mixture containing 40% Al$_2$O$_3$ sintered at 1600° C for only 4 hours contained a trace of extraneous phase as well as alumina, while those sintered at 1650° C for 4 hours contained an extraneous phase and a trace of alumina. Example 12 of Table II shows that the same starting material sintered for 4 hours at 1550° C contained both α - Si$_3$N$_4$ and Al$_2$O$_3$ as well as SIALON, indicating incomplete reaction.

Examples in Table I refer to materials which did not contain Y$_2$O$_3$ and, in no case, is the average strength greater than 35,000 p.s.i. or that of any individual specimen greater than 39,000 p.s.i. Examples 11 and 28 in Table II contained Y$_2$O$_3$ but were sintered at 1750° C for 15 minutes and the average strengths did not exceed 26,000 p.s.i., or that of any indivdual specimen 34,000 p.s.i. On the other hand, the remaining entries in Table II all contained Y$_2$O$_3$ in amounts ranging from 1% to 25% by weight of the original mixture of Al$_2$O$_3$ and Si$_3$N$_4$ and were sintered for times ranging from 3 to 12 hours at temperatures between 1550° C and 1700° C, and half of these had average strengths in excess of 45,000 p.s.i.

The effect of the proportion of Y$_2$O$_3$ contained in the original mixture can also be seen from Table II. Considering, again, only materials heated to temperatures of 1700° C and below, it can be seen from entries 1 to 10, inclusive, that, with only 1% Y$_2$O$_3$ additive, average strengths over 45,000 p.s.i. were obtained in two cases, examples 6 and 10, both of which had base compositions of 84% Si$_3$N$_4$ and 16% Al$_2$O$_3$. This would seem to indicate that to obtain 45,000 p.s.i. or greater Al$_2$O$_3$ must be kept below 20% (when 1% Y$_2$O$_3$ is added) while employing the high end of the ranges for either the sintering time or temperature. Similarly, to obtain bend strengths between 35,000–45,000 p.s.i., the same criteria must be observed. Examples 12 through 26 deal with materials prepared with 3% $Y_2O_3$ under the specified sintering conditions. In this category, most materials had average strengths in excess of 45,000 p.s.i. and one (example 22) exceeded 80,000 p.s.i. Strength levels at 3% $Y_2O_3$ do not seem to be dependent on alumina content added. Examples 29 through 34 refer to preparations with 6% $Y_2O_3$. All but one of these (33) exceeded 45,000 p.s.i. in average strength and individual specimens (example 32) exceeded 90,000 p.s.i. Example 35 involves materials prepared with 16.1% $Y_2O_3$ and the average strength, again, exceeds 45,000 p.s.i. Examples 36 through 40 describe materials prepared with 25% $Y_2O_3$ and, in one case (example 36), the average strength exceeds 45,000 p.s.i. High temperatures or prolonged sintering times seem to hinder strength level when 25% $Y_2O_3$ is employed. Thus, starting materials with $Y_2O_3$ additive contents up to 25% have been used to prepare high strength SIALON ceramics by pressureless sintering, with the highest strengths obtained in the middle portion of the range, rather than at the extremes.

The effect of sintering temperature and time can be seen from Table II, as well. Examples 6 and 10 show that, with 1% $Y_2O_3$ additive, strong materials can be prepared at temperatures from 1600° C to 1700° C, provided that suitable base compositions and sintering times are employed. The remainder of the Table shows that, with sintering temperatures between 1550° C and 1700° C and times of from 3 to 12 hours, strong materials are produced with $Y_2O_3$ contents ranging from 3% to 25%, although when the firing temperature is 1550° C, reaction between the silicon nitride and alumina is incomplete (presence of $\alpha$ $Si_3N_4$ in the product, item 12).

The data in Table II does not indicate that the base mixture composition (proportion of $Si_3N_4$ and $Al_2O_3$ in the broad range) has a major effect on the strength of the final material, except when only 1% $Y_2O_3$ is incorporated. In that case, only materials with 84% $Si_3N_4$ and 16% $Al_2O_3$ produced strong SIALON products. However, the composition of the base mixture, along with the sintering conditions, had a major effect on the composition of the final product. Only examples 20 (84% $Si_3N_4$, 16% $Al_2O_3$ with 3% $Y_2O_3$), 30, 31 and 32 (84% $Si_3N_4$, 16% $Al_2O_3$ with 6% $Y_2O_3$), and example 35 (64.4% $Si_3N_4$, 35.6% $Al_2O_3$ with 16.1% $Y_2O_3$), of those which were analyzed by x-ray diffraction, were found to contain SIALON as the only crystalline phase. The presence of but a single crystalline phase may be advantageous in some applications.

In review, it has been found:
a. that when about 3% yttria is added to a mixture of $Al_2O_3$ and $Si_3N_4$, the resulting sintered ceramic will have a transverse rupture strength (4-point bend test) of at least 45,000 p.s.i. when the broad sintering conditions of this invention are observed (temperature 1550°–1700° C; time 3-12 hrs.) and the alumina content is 16-40% of the $Si_3N_4$. Although not reported in the tables, when such a mixture is sintered at temperatures outside said range, or for a sintering time below said range, insufficient strength will be generally developed; the high end of the sintering time range represents a practical limit although it is operably possible to obtain adequate strengths with prolonged sintering periods with the proper sintering temperature;
b. that a SIALON example having about a 3% yttria additive, will substantially exhibit a single phase upon x-ray examination if the alumina content is restricted to 16% or moderately less while the sintering conditions taught herein are observed;
c. that when yttria additives approaching the extreme ends of the operative yttria range taught herein (such as 1% or 25%) are utilized, somewhat lower traverse rupture strengths will be observed, but no less than 35,000 p.s.i., provided the alumina content is maintained below 20% of the ceramic and the sintering period is adjusted to (i) utilize the shortest period within the operative range of 3-12 hrs. for high yttria and to (ii) utilize the high end of the ranges for either the sintering time or temperature for low yttria;
d. that when high purity $Si_3N_4$ is employed, the optimum or highest transverse rupture strengths will be obtained, at least 60,000 p.s.i. T,0120 T,0130

1. A method of making ceramics, comprising:
a. compact a desired powdered shape from a mixture of 99.9% pure $Si_3N_4$ powder, $Al_2O_3$ powder, and $Y_2O_3$ powder, said $Y_2O_3$ being present in said mixture at about essentially a 3% additive by weight and said $Al_2O_3$ being present in an amount at about essentially 16% by weight
b. with the absence of pressure, heat said shape to a temperature between 1550°–1700° C and hold at said temperature for a period of time at about essentially 12 hours, the resulting ceramic exhibiting a transverse rupture strength of at least 80,000 psi.

2. A method of making ceramics, comprising:
a. compact a desired powdered shape from a mixture of $Si_3N_4$ powder, $Al_2O_3$ powder, and $Y_2O_3$ powder, said $Y_2O_3$ being present in said mixture as about essentially a 3% additive by weight and said $Al_2O_3$ being present in an amount essentially about 16% by weight,
b. With the absence of pressure, heat said shape to a temperature between 1550°–1700° C and hold at said temperature for a period of time between 3-12 hours, said resulting ceramic exhibiting substantially a single phase and having a room temperature transverse rupture strength of at least 45,000 psi.

* * * * *

UNITED STATES PATENT AND TRADEMARK OFFICE
CERTIFICATE OF CORRECTION

PATENT NO. : 4,071,371

DATED : Jan. 31, 1978

INVENTOR(S) : Morton E. Milberg; Wayne M. Miller

It is certified that error appears in the above-identified patent and that said Letters Patent are hereby corrected as shown below:

-- Attach Table I and Table II. --

Signed and Sealed this

Fourth Day of July 1978

[SEAL]

Attest:

RUTH C. MASON
*Attesting Officer*

DONALD W. BANNER
*Commissioner of Patents and Trademarks*

TABLE I

| Example | Si₃N₄ | Al₂O₃ | Other | Temp°C | Time-Hr | ATM | $\sigma_F$ | $\sigma_F$ Range | n | $\rho$ | Composition | Comments |
|---|---|---|---|---|---|---|---|---|---|---|---|---|
| 1 | 60 P | 40 | | 1600 | 4 | Ar | WEAK | | | | | Slip Cast |
| 2 | 60 P | 40 | | 1620 | 3 | Ar | 4000 | 38-4100 | 3 | | | Slip Cast |
| 3 | 60 P | 40 | | 1650 | 4 | Ar | 2500 | 24-2700 | 3 | | | Slip Cast |
| 4 | 60 P | 40 | | 1650 | 4 | Ar | 13000 | 7-20000 | 3 | | S+X, Tr A&Si | Slip Cast |
| 5 | 60 P | 40 | | 1670 | 3 | Ar | 3300 | 33-3300 | 3 | | S, Tr A&Si | Slip Cast |
| 6 | 60 P | 40 | | 1700 | 8 | N₂ | 23000 | 19-31000 | 3 | | S+X, Tr A&Si | |
| 7 | 60 | 40 | | 1750 | .25 | N₂ | 16000 | 11-26000 | 3 | | S+X | |
| 8 | 60 | 40 | | 1750 | .25 | Ar | 11000 | 8-12000 | 8 | | S+X | |
| 9 | 60 | 40 | | 1750 | .25 | Ar | 14000 | 12-18000 | 5 | 2.17 | S+X | |
| 10 | 60 | 40 | | 1750 | .25 | Ar | 24000 | 20-27000 | 4 | | | |
| 11 | 60 | 40 | | 1750 | .25 | Ar | 19000 | 15-26000 | 5 | 2.88 | S+X, Tr A&Si | Slip Cast |
| 12 | 60 | 40 | | 1750 | .25 | N₂ | 35000 | 30-39000 | 5 | | S+X | |
| 13 | 60 P | 40 | | 1750 | .25 | Ar | 20000 | 16-22000 | 6 | 2.86 | S+X | |
| 14 | 60 H | 40 | | 1750 | .25 | Ar | 10000 | 8-10000 | 5 | | S+X, Tr A&Si | |
| 15 | 60 | 40 | 7% AlN 2% MgO | 1700 | 8 | N₂ | 18000 | 17-19000 | 2 | | S, Si X | |
| 16 | 60 | 40 | +1 w/o MgO | 1750 | .25 | N₂ | 24000 | 16-30000 | 4 | | | |
| 17 | 60 | 40 | +2 w/o MgO | 1750 | .25 | Ar | 24000 | 19-29000 | 3 | | | |
| 18 | 60 | 40 | +5 w/o MgO | 1750 | .25 | N₂ | 18000 | 12-21000 | 4 | | | Pcs Blistered |
| 19 | 60 | 40 | +5 w/o MgO | 1750 | .25 | Ar | 28000 | 22-36000 | 3 | 2.92 | S+X | |

TABLE II

| Example | Si₃N₄ | Al₂O₃ | Y₂O₃ | Temp°C | Time Hr | ATM | $\sigma_F$ | $\sigma_F$ range | n | ρ | Composition | Comments |
|---|---|---|---|---|---|---|---|---|---|---|---|---|
| 1 | 84 | 16 | +1 | 1600 | 3 | | 28000 | 23-33000 | 4 | | | |
| 2 | 60 | 40 | +1 | 1600 | 3 | | 26000 | 20-33000 | 5 | | | |
| 3 | 84 | 16 | +1 | 1600 | 8 | | 27700 | 24-29000 | 4 | | | |
| 4 | 60 | 40 | +1 | 1600 | 8 | | 29000 | 24-35000 | 4 | | | |
| 5 | 84 | 16 | +1 | 1600 | 12 | | 34000 | 30-39000 | 3 | | | |
| 6 | 60 | 40 | +1 | 1600 | 12 | | 46000 | 42-54000 | 3 | | | |
| 7 | 84 | 16 | +1 | 1650 | 4 | | 38000 | 36-40000 | 3 | | | |
| 8 | 60 | 40 | +1 | 1650 | 4 | | 41000 | 31-51000 | 4 | | | |
| 9 | 84 | 16 | +1 | 1700 | 4 | | 34000 | 32-37000 | 4 | | | |
| 10 | 60 | 40 | +1 | 1700 | 4 | | 50000 | 43-61000 | 3 | | | |
| 11 | 60 | 40 | +1 | 1750 | .25 | | 20000 | 16-25000 | 2 | 2.98 | S+X | Pressed Bars |
| 12 | 60 | 40 | +1 | 1550 | | | 54000 | 35-72000 | 6 | | S+A+ | |
| 13 | 60 | 40 | +3 | 1800 | 4 | | 52000 | 43-63000 | 4 | | S+A, Tr X& Si₂ | |
| 14 | 80 | 20 | +3 | 1600 | 4 | | 56000 | 34-80000 | 12 | | | |
| 15 | 82 | 18 | +3 | 1600 | 4 | | 41000 | 23-43000 | 4 | | | |
| 16 | 82 | 18 | +3 | 1600 | 4 | | 40000 | 20-44000 | 4 | | S+T A | |
| 17 | 84 | 16 | +3 | 1600 | 4 | | 47000 | 31-59000 | 4 | | S+T₃ A | |
| 18 | 60 | 40 | +3 | 1600 | 8 | | 47000 | 37-56000 | 6 | | S+A | |
| 19 | 80 | 20 | +3 | 1600 | 8 | | 47000 | 45-49000 | 2 | | S+Si A | |
| 20 | 82 | 18 | +3 | 1600 | 8 | | 55000 | 45-69000 | 6 | | S | |
| 21 | 84 | 16 | +3 | 1600 | 8 | | 61000 | 51-82000 | 3 | | | |
| 22 | 84 | 16 | +3 | 1600 | 12 | | 82000 | 80-86000 | 3 | 3.10 | | |
| 23 | 60 | 40 | +3 | 1600 | 12 | | 49000 | 47-51000 | 2 | | | |
| 24 | 60 | 40 | +3 | 1620 | 3 | | 31000 | 19-54000 | 7 | | S+X, Tr & Si | |
| 25 | 60 | 40 | +3 | 1650 | 4 | | 29000 | 28-36000 | 5 | | | |
| 26 | 60 | 40 | +3 | 1670 | 3 | | 33000 | 28-36000 | 4 | | | |
| 27 | 84 | 16 | +3 | 1700 | 8 | | 57000 | 49-63000 | 3 | | | |
| 28 | 60 | 40 | +3 | 1700 | 8 | | 26000 | 20-34000 | 5 | 2.80 | S+X | Pressed Bars |
| 29 | 60 | 40 | +3 | 1600 | .25 | | 63000 | 55-78000 | 3 | | S+A | |
| 30 | 84 | 16 | +6 | 1600 | 4 | | 52000 | 46-78000 | 3 | | S+A | |
| 31 | 84 | 16 | +6 | 1600 | 4 | | 47000 | 43-58000 | 5 | | S | |
| 32 | 84 | 16 | +6 | 1600 | 8 | | 70000 | 51-94000 | 7 | | S | |
| 33 | 84 | 16 | +6 | 1600 | 8 | | 44000 | 36-54000 | 4 | | S | |
| 34 | 84 P | 16 | +6 | 1600 | 12 | | 74000 | 72-75000 | 2 | | | |
| 35 | 64.4 | 35.6 | +16.1 | 1600 | 4 | | 45000 | 32-61000 | 7 | | | |
| 36 | 66.7 | 33.3 | +25 | 1600 | 3 | | 46000 | 32-61000 | 2 | | | |
| 37 | 66.7 | 33.3 | +25 | 1600 | 8 | | 39000 | 37-41000 | 2 | | | |
| 38 | 66.7 | 33.3 | +25 | 1600 | 12 | | 42000 | 24-34000 | 4 | | | |
| 39 | 66.7 | 33.3 | +25 | 1650 | 4 | | 29000 | 38-46000 | 3 | | | |
| 40 | 66.7 | 33.3 | +25 | 1700 | 4 | | 31000 | 30-33000 | 2 | | | |